(12) United States Patent
Hansen et al.

(10) Patent No.: US 6,217,768 B1
(45) Date of Patent: Apr. 17, 2001

(54) METHOD FOR TREATING SLUDGE FROM WASTEWATER TREATMENT

(75) Inventors: Bengt Hansen, Helsingborg (SE); Simo Jokinen, Oulu (FI)

(73) Assignee: Kemira Kemi AB, Helsingborg (SE)

(*) Notice: Subject to any disclaimer, the term of this patent is extended or adjusted under 35 U.S.C. 154(b) by 0 days.

(21) Appl. No.: 09/395,739

(22) Filed: Sep. 14, 1999

Related U.S. Application Data

(63) Continuation of application No. PCT/SE98/00444, filed on Mar. 12, 1998.

(30) Foreign Application Priority Data

Mar. 14, 1997 (SE) ..................................... 9700917

(51) Int. Cl.$^7$ ............................ C02F 3/02; C01B 25/56
(52) U.S. Cl. ...................... 210/622; 210/712; 210/722; 210/724; 210/737; 210/906; 423/140; 423/311
(58) Field of Search ................................ 210/622, 631, 210/702, 712, 723, 724, 906, 907, 737, 722; 423/140, 311

(56) References Cited

U.S. PATENT DOCUMENTS

| | | | |
|---|---|---|---|
| 3,785,797 | * | 1/1974 | Strelzhoff et al. |
| 4,416,779 | | 11/1983 | Ripl et al. |
| 5,141,646 | * | 8/1992 | Rozich . |
| 5,154,830 | * | 10/1992 | Paul et al. |
| 5,190,655 | * | 3/1993 | Karlsson . |
| 5,720,882 | * | 2/1998 | Stendahl et al. |
| 5,759,401 | * | 6/1998 | Boussely et al. |
| 5,888,404 | * | 3/1999 | Jokinen . |

FOREIGN PATENT DOCUMENTS

| | | |
|---|---|---|
| 10530396 | 3/1993 | (EP) . |
| 9620894 | 7/1996 | (WO) . |

OTHER PUBLICATIONS

Pat. Abstracts of Japan, vol. 91, No. 806 abstract of JP 31–14587 A, May 15, 1991.

* cited by examiner

*Primary Examiner*—David A. Simmons
*Assistant Examiner*—Fred Prince
(74) *Attorney, Agent, or Firm*—Birch, Stewart, Kolasch & Birch, LLP

(57) ABSTRACT

A method for treating sludge from wastewater purification is described. In the method, a sludge is treated, which contains phosphorus and at least one metal which originates from precipitation chemicals and which is selected among divalent iron and aluminum, the pH of the sludge being adjusted to below 4, preferably below 2, for dissolving the content of the phosphorus and said metal in the sludge; the remaining sludge is separated; the solution relieved of sludge and containing phosphorus and said metal is treated for precipitation of the phosphorus content of the solution as $FePO_4$ at a pH of 2–3; and precipitated $FePO_4$ is separated. The method is characterized in that the solution which remains after separation of $FePO_4$ and which contains said metal from the precipitation chemicals, is recycled to the wastewater purification. The phosphorus content of the solution is precipitated as $FePO_4$ by adding an at least equivalent amount of $Fe^{3-}$.

18 Claims, 1 Drawing Sheet

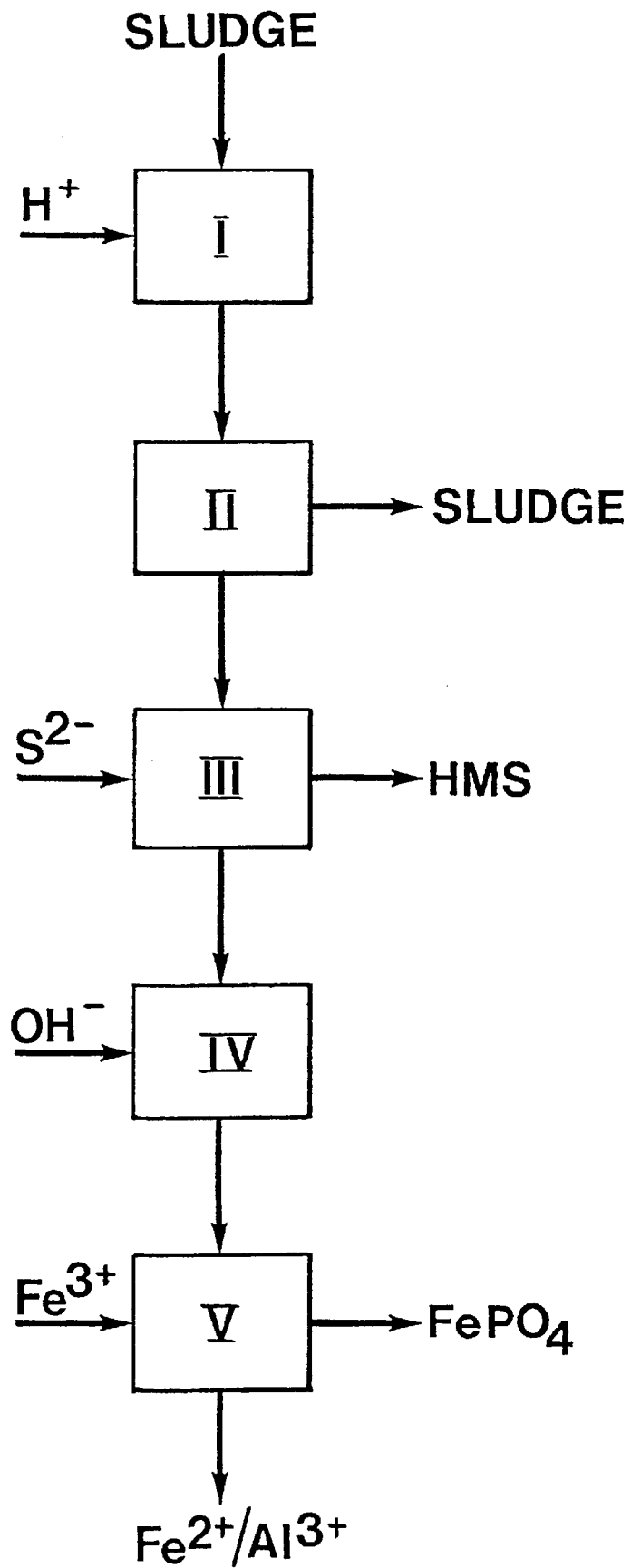

METHOD FOR TREATING SLUDGE FROM WASTEWATER TREATMENT

This application is a Continuation of PCT International Application No. PCT/SE98/00444 filed on Mar. 12, 1998, which designated the United States and on which priority is claimed under 35 U.S.C. § 120, the entire contents of which are hereby incorporated by reference.

The present invention relates to a method for treating sludge from wastewater treatment. More specifically, the invention relates to such a process, in which the precipitation chemicals are recovered from the sludge and recycled to wastewater treatment.

In the treatment of wastewater, as a rule first mechanical separation of solid impurities is carried out, for instance with the aid of screens and grit chambers and by allowing the solid impurities to settle in a preliminary settling device. Moreover, the wastewater is treated by chemical purification and preferably also by biological purification. The chemical purification is done such that precipitation chemicals, such as iron salts or aluminum salts, are added to the water and, by flocculation, precipitate and collect impurities in the wastewater such as phosphates and particles. In biological purification, which can take place, for instance, by an activated sludge process or by means of a trickling filter, the wastewater is purified by means of microorganisms. In wastewater treatment, large quantities of sludge are obtained, which must be taken care of. This can be carried out by digesting the sludge, in which case organic substances are converted into inorganics, assisted by anaerobic microorganisms. The sludge obtained after digestion, i.e. digested sludge, can be used for landfilling or as fertilizer. If the digested sludge is to be used as fertilizer, its content of heavy metals, i.e. metals from the group consisting of chromium, nickel, copper, zinc, cadmium, lead and mercury, should first be removed. Besides, the sludge contains the added precipitation chemicals, and from the economic point of view these should, if possible, be recovered and reused. In the present invention, precipitation chemicals relate to iron and/or aluminium-containing compounds, such as ferric chloride, ferrous sulphate, ferric sulphate, aluminium sulphate and polyaluminium chloride.

Different methods for treating sludge from waste-water treatment are known, and as an example of prior-art technique, reference is made to WO96/20894, which was published on Jul. 11, 1996. According to this reference, wastewater sludge is treated by acidifying the sludge to dissolve metals and phosphorus from the sludge. After separation of the remaining sludge, the precipitation chemicals iron and aluminum are recovered as phosphates by adjusting the pH to about 2–4. After separation of precipitated phosphates, a further precipitation is carried out, this time of dissolved heavy metals, which are precipitated by increasing the pH to about 7–9 and adding precipitants, such as sulphides. After separation, the heavy metal sulphides are deposited, while the filtered water can be recycled to the wastewater treatment procedure. The resulting phosphate deposit, which contains iron phosphate and possibly also aluminum phosphates, can be treated for recovery of the precipitation chemicals iron and aluminum by adding an alkali hydroxide, such as sodium hydroxide, thereby forming insoluble iron hydroxide and a solution containing soluble alkali phosphates and aluminum hydroxide. The iron hydroxide can be dissolved in an acid, such as hydrochloric acid, sulphuric acid or nitric acid, to give a solution of the corresponding iron salt which is usable as precipitation chemical.

According to the above-mentioned WO96/20894, the iron content of the sludge is present in trivalent form, or the iron is oxidised to trivalent form by adding an oxidant such as hydrogen peroxide. No external addition of trivalent iron takes place. However, the external addition of phosphorus in the form of phosphoric acid or phosphate can take place to adjust the molar ratio of phosphoric acid to phosphorus to about 1:1.

As is apparent from above, WO 96/20894 accomplishes a treatment of wastewater sludge, the sludge being relieved of undesired metals such as heavy metals and phosphorus. The content of metals originating from precipitation chemicals, such as iron and aluminum, in the sludge, is recovered as phosphates and cannot be recycled directly to the wastewater purification process to be used as precipitation chemicals, but must first be converted by additional dissolving and precipitating procedures. Since each dissolving and precipitating procedure means a risk of decreased yield of the chemical at issue, it would be advantageous if a process could be provided in which the metals used in the precipitation chemicals, after being dissolved from the wastewater sludge, can be recycled directly to the wastewater purification process, without any intermediate precipitating and dissolving steps.

According to the present invention, the above-mentioned drawbacks are obviated or reduced, and a method is provided for treating sludge from wastewater purification, in which iron and/or aluminium from the precipitation chemicals is dissolved from sludge, and the resulting solution is recycled to the wastewater treatment.

More specifically, the invention provides a method for treating sludge from wastewater purification, said sludge containing phosphorus and at least one metal which originates from precipitation chemicals and which is selected among $Fe^{2+}$ and $Al^{3+}$, the pH of the sludge being adjusted to below 4 for dissolving the content of phosphorus and said metal in the sludge;

separating the remaining sludge;

treating the solution which is relieved of sludge and which contains phosphorus and said metal, for precipitation of the content of phosphorus in the solution as $FePO_4$ at a pH of 2–3; and separating the precipitated $FePO_4$. The invention is characterized in that the remaining solution, which contains said metal from the precipitation chemicals, is recycled to the wastewater treatment.

Further advantages and distinctive features of the invention will be evident from the following description and the appended claims.

The invention will now be described in more detail with reference to the accompanying drawing, which schematically shows a presently preferred embodiment of the invention.

Sludge from a wastewater purification plant (not shown) containing, inter alia, phosphorus in the form phosphate and metals originating from the precipitation chemicals that are used in the wastewater purification, is supplied to a first step I for dissolving the content of phosphorus and metals in the sludge from the precipitation chemicals. According to the invention, the metal or metals originating from the precipitation chemicals are iron and/or aluminum, on the condition that iron is present in divalent form ($Fe^{2+}$). Originally, the iron is present in trivalent form ($Fe^{3+}$) in the precipitation chemical, but when the precipitation chemical in the chemical purification step of the wastewater treatment has been added, flocculated and passed to the sludge phase, the iron is reduced to divalent form, for instance when digesting the sludge.

In the first step I, the content of phosphorus, iron and/or aluminium in the sludge is dissolved by acidifying the sludge. This is effected by subjected the sludge to an acid hydrolysis at a pH below 4, preferably below 2, with an acid, e.g. sulphuric acid. The hydrolysis is effected under conditions that result in the desired dissolution. Neither temperature nor pressure is critical in the hydrolysis, and ambient temperature and pressure car be used. If desired, an increased temperature and/or pressure, however, can be used in order to, for instance, accelerate the hydrolysis. Normally the temperature can be in the range of about 0–200° C., and preferably the temperature is increased such as about 100–140° C., to accelerate the hydrolysis. Correspondingly, the pressure may vary from ambient pressure (atmospheric pressure) up to about 1 MPa depending on the hydrolysis temperature. It is in many cases sufficient for the pH to be just below 4 in the hydrolysis, but preferably the pH in the hydrolysis is below 2 for complete dissolution of the content of phosphorus, iron and/or aluminium in the sludge.

After completion of the hydrolysis, the remaining sludge and hydrolytic fluid are supplied to a second step II for separating the remaining sludge, for instance by filtration or centrifugation.

After separating the sludge, the solution relieved of sludge which contains dissolved phosphorus and metal from the sludge in the form of phosphate and dissolved metal salts, is supplied to a third step III for separating heavy metals, if any. By heavy metals are meant, as mentioned above, metals from the group consisting of chromium, nickel, copper, zinc, cadmium, lead and mercury. If there are no heavy metals or if they can be neglected, this step can be omitted.

In the heavy metal separation step III, heavy metals are separated by adding a substance which forms an insoluble compound with heavy metals. Preferably, this substance is a sulphide ion source, such as sodium sulphide, such that the heavy metals are precipitated as heavy metal sulphides (HMS).

Alternatively, the content of phosphorus in the solution can first be precipitated as $FePO_4$ according to steps IV and V described below before the heavy metals are precipitated by adding a sulphide ion source.

If heavy metal sulphides can be accepted in the sludge which is separated after the acid hydrolysis, a further alternative implies that a sulphide ion source is added even before or in connection with the acid hydrolysis for binding any heavy metals present as sulphides. In this case, the subsequent, specific sulphide precipitation step III can be omitted.

When the solution has been relieved of heavy metals, it is supplied to a fourth step IV, which is a step in which the pH of the solution is adjusted to 2–3, preferably 2–2.8. The pH is adjusted by adding a suitable base, such as sodium hydroxide or magnesium oxide. The adjustment of the pH is effected as a preliminary step before the subsequent precipitation of the content of phosphorus in the solution as $FePO_4$, which is insoluble in the stated pH range.

If the pH of the solution has already been adjusted, in the first step above, in which the pH is adjusted to below 4, to be in the range of 2–3, no subsequent adjustment of the pH is necessary after separating the sludge.

The solution from step IV, which contains phosphate ($PO_4^{3-}$), divalent iron ($Fe^{2+}$) and/or aluminum ($Al^{3+}$), is then supplied to a fifth step V for precipitating the phosphorus content of solution as iron phosphate ($FePO_4$). This takes place by adding to the solution a source of trivalent iron ($Fe^{3+}$), e.g. ferric chloride. With a view to achieving complete precipitation of the phosphorus content of the solution, the trivalent iron is preferably added in an at least equimolar amount, i.e. in such an amount that the molar ratio of the trivalent iron to the phosphorus content of the solution is at least about 1:1, such as about 1–1.5:1. As mentioned above, trivalent iron phosphate is insoluble in the pH range of 2–3, preferably 2–2.8, and, in this range, is precipitated in very pure form. To achieve as complete precipitation as possible of the phosphorus content of the solution, further a certain sojourn time should pass between the adding of the source of trivalent iron and the separation of the formed iron phosphate. Suitably, the sojourn time is from about 5 min to about 6 h, preferably from about 30 min to about 1 h. The precipitated iron phosphate is then removed from the solution in a per se known manner, for instance by filtration or centrifugation.

Even if the method has been described above such that the step IV with pH adjustment of the solution is carried out before step V with the addition of a source of trivalent iron ($Fe^{3+}$), it should be understood that the relative order of steps IV and V is optional in the present invention. Thus it is quite possible, and in many cases also preferred first to add the source of trivalent iron and only then to adjust the pH to 2–3. In the latter case, the above-mentioned sojourn time is placed in connection with the pH adjustment.

After separation of the precipitated iron phosphate, the remaining solution contains the content of metal originating from the precipitation chemicals and being $Fe^{2+}$ and/or $Al^{3+}$, in the original sludge. This solution, which is relieved of sludge, heavy metals and phosphate, is recycled to the wastewater purification for renewed use of the content of iron and aluminum in the solution as precipitation chemicals. To make the iron content of the solution function actively as a precipitation chemical, it must be transformed from divalent to trivalent form. This is preferably carried out by the wastewater purification comprising an aerobic biological purification step, and the solution being added to this purification step, the divalent iron being oxidized to trivalent iron in the aerobic biological purification step. If the recycled solution contains divalent iron, it will thus for this reason be added to the wastewater purification prior to or in the aerobic biological purification step. If the solution contains aluminum only, it can in principle be added at an optional point in the wastewater purification. It goes without saying that it is also possible to oxidize the divalent iron content of the solution to trivalent iron in some other manner, for instance by adding hydrogen peroxide. In this case, the solution can be added to the wastewater purification at an optional point.

The ferric phosphate ($FePO_4$) resulting from the above described precipitation can be used as fertilizer in agriculture. It is also possible to recover the trivalent iron from the ferric phosphate for renewed use as precipitation reagent by treating the precipitation of ferric phosphate with an alkali, such as sodium hydroxide, to form ferric hydroxide which is separated and treated with an acid, such as hydrochloric acid or sulphuric acid, to form the corresponding ferric salt, which can then be used as precipitation reagent.

It will be appreciated that the invention offers a simple and smooth method for recovering, from sludge, metal originating from precipitation chemicals and recirculation of this metal to the wastewater purification for renewed use. By the metal, in the method, being constantly kept in solution, and there being no separation of the metal in one or more precipitation steps, the loss of the metal is minimized in the inventive method. The possibility of recovering the trivalent iron which constitutes precipitation reagent for the phosphorus content of the sludge also makes the inventive method being highly economic.

In addition to the recycling of iron and aluminum to the wastewater purification for renewed use as precipitation chemicals, a sludge is achieved by the present invention, which is relieved of undesired impurities and which can be used as, for instance fertilizer. Any heavy metals included are recovered in the invention preferably as a separate precipitate which can be deposited or be further processed for recovering the heavy metals. Finally, also the phosphorus content of the original sludge is recovered, according to the invention, separately in the form of ferric phosphate, which as stated above can be treated for recovering the trivalent iron. In this recovery of the trivalent iron, the phosphate is obtained as sodium phosphate ($Na_3PO_4$) which, for instance, can be used as raw material for the production of fertilizer in agriculture or as raw material in the detergent industry.

As is obvious from that stated above, the emission of noxious or undesired substances is eliminated or reduced to a minimum level according to the invention, and consequently the invention provides an extremely environmentally friendly method for treating sludge from wastewater purification.

In order to further illustrate the invention, some embodiments will be described below, which, however, are not intended to limit the scope of the invention.

EXAMPLE 1

Sludge from wastewater purification in a pilot plant was subjected to acid hydrolysis at a pH of 1.6 and a temperature of about 140° C. for about 1 h. The precipitation chemicals comprised both ferric chloride and ferric sulphate and polyaluminum chloride, and the sludge therefore contained both $Fe^{2+}$ and $Al^{3+}$. After the hydrolysis, the remaining sludge was separated by centrifugation, and the solution relieved of sludge (clear phase) was used in the test which was carried out at a temperature of about 20° C. A trivalent iron salt, which is stated in more detail in Table 1, was added to the solution under agitation to avoid settling in such an amount that the molar ratio $Fe^{3+}: PO_4^{3-}$ was 1:1. Then NaOH was added to the solution under continued agitation in order to adjust the pH of the solution to 2.6. In the pH adjustment, iron phosphate ($FePO_4$) was precipitated from the solution and after agitation and precipitation for 1 h, the resulting iron phosphate precipitation was separated from the solution by filtration through a GF/A filter. The remaining solution was then analyzed in respect of the content of $Fe^{2-}$ and $Al^{3+}$. The results are stated in Table 1. In Table 1, $Fe^{2+}$ in and $Al^{3+}$ in designate the content of $Fe^{2+}$ and $Al^{3+}$, respectively, of the original sludge. $Fe^{2+}$ out and $Al^{3+}$ out designate the $Fe^{2+}$ and $Al^{3+}$ content of the final, recycled solution. P recycled, $Fe^{2+}$ recycled and $Al^{3+}$ recycled designate the percentage amount of P, $Fe^{2+}$ and $Al^{3+}$, respectively, which is recycled to the waste-water purification.

As appears from Table 1, the invention allows recycling of about 90% of $Fe^{2+}$ and about 75% of $Al^{3+}$ from the precipitation chemicals in the sludge.

EXAMPLE 2

Wastewater sludge from a commercial wastewater purification plant which used ferric chloride and iron sulphate as precipitation chemicals, was subjected, in two different tests (Tests 1 and 2) to acid hydrolysis at a pH of 1.8 and a temperature of about 140° C. for about 1 h. After the hydrolysis, the remaining sludge was separated by means of a centrifugal decanter, and the solution relieved of sludge (clear phase) was used in the test which was carried out at a temperature of about 50–60° C. A trivalent iron salt was added to the solution in a mixing tank such that the molar ratio of $Fe^{3+}$ to $PO_4^{3-}$ was about 1:1. The added trivalent iron was an iron chloride product containing 13.7% by weight $Fe^{3+}$ and 26–28% by weight $Cl^-$. This product can be obtained from Kemira, Kemwater, Sweden, under the designation PIX-111. The sojourn time in the mixing tank was 30 min. In a subsequent mixing tank, NaOH was added for adjusting the pH to 2.1–2.8. The sojourn time in this mixing tank was 30 min. In the pH adjustment, iron phosphate ($FePO_4$) was precipitated, which was separated by the solution from the mixing tank being pumped to a centrifugal decanter. A cationic polymer Zetag 89 supplied by Allied Colloid, Great Britain, was added to ensure good separation in the decanter. An analysis was made of the $Fe^{2+}$ content ($Fe^{2+}$ in) of the original sludge and of the $Fe^{2+}$ ($Fe^{2+}$ out) content of the final solution. The results from Tests 1 and 2 are stated in Table 2, and the values concern average values in the tests, which were carried out during 4 h (Test 1) and 6 h (Test 2).

Table 2 shows that at least 80% of the $Fe^{2+}$ content of the sludge can be recycled ($Fe^{2+}$ recycled) to the water purification procedure.

TABLE 2

| | $Fe^{3+}$-source | $FE^{3+}/P$ (mole/mole) | $Fe^{2+}$ in (mg/l) | $Fe^{2+}$ out (mg/l) | $Fe^{2+}$ recycled (%) |
|---|---|---|---|---|---|
| Test 1 | PIX-111 | 1.07:1 | 56 | 47 | 84 |
| Test 2 | PIX-111 | 1.30:1 | 39.5 | 32.6 | 83 |

What is claimed is:

1. A method for treating sludge from wastewater purification, said sludge containing phosphorous and at least one metal which originates from precipitation chemicals and which is selected from among $Fe^{2+}$ and $Al^{3+}$, the method comprising:

TABLE 1

| $Fe^{3+}$-source | $Fe^{3+}/P$ in (mole/mole) | P recycled (%) | $Fe^{2+}$ in (mg/l) | $Fe^{2+}$ out (mg/l) | $Fe^{2+}$ recycled (%) | $Al^{3+}$ in (mg/l) | $Al^{3+}$ out (mg/l) | $Al^{3+}$ recycled (%) |
|---|---|---|---|---|---|---|---|---|
| JKL[1] | 1:1 | 3.6 | 726 | 631 | 87 | 27 | 20 | 74 |
| PIX-111[2] | 1:1 | 3.0 | 726 | 654 | 90 | 27 | 19 | 70 |
| PIX-115[3] | 1:1 | 8.4 | 726 | 670 | 92 | 27 | 20 | 74 |

[1] JKL = iron chloride sulphate with 11.6% by weight $Fe^{3+}$ and max. 20% by weight $Cl^-$ and 20% $SO_4^{2-}$. JKL can be obtained from Kemira Kemwater, Helsingborg, Sweden.
[2] PIX-111 = iron chloride with 13.7% by weight $Fe^{3+}$ and 26–28% by weight $Cl^-$. PIX-111 can be obtained from Kemira Kemwater, Helsingborg, Sweden.
[3] PIX-115 = iron sulphate with 11.5% by weight $Fe^{3+}$ and 32% by weight $SO_4^{2-}$. PIX-115 can be obtained from Kemira Kemwater, Helsingborg, Sweden.

adjusting the pH of the sludge to below 4 for dissolving the content of phosphorus and said metal in the sludge;

separating the sludge to yield a solution;

treating the solution which is relieved of sludge and which contains phosphorus and said metal, the treating comprising adding at least an amount of $Fe^{3+}$ equivalent to the amount of phosphorous in the solution, for precipitation of the content of phosphorous in the solution as $FePO_4$ at a pH of 2–3;

separating the precipitated $FePO_4$; and recycling the solution, which contains said metal from the precipitation chemicals, to wastewater treatment.

2. The method as claimed in claim 1, characterized in that the metal from the precipitation chemicals is $Fe^{2+}$.

3. The method as claimed in claim 1 or 2, characterized in that in the step of adjusting the pH of the sludge, the pH of the sludge is adjusted to below 2 for dissolving the content of phosphorus and said metal in the sludge.

4. The method as claimed in claim 1, characterized in that the remaining solution contains $Fe^{2+}$ and is recycled to wastewater treatment prior to an aerobic biological purification step.

5. The method as claimed in claim 1, characterized in that the remaining solution contains $Fe^{2+}$ and is recycled to an aerobic biological purification step in the wastewater treatment.

6. The method as claimed in claim 1, characterized in that after the step of separating the sludge, heavy metals are precipitated as sulphides by adding a sulphide ion source to the solution.

7. The method as claimed in claim 6, characterized in that the sulphide ion source is added to the solution before the step of treating the solution.

8. The method as claimed in claim 1, characterized in that the content of phosphorus and said metal which originates from the precipitation chemicals and which is present in the sludge is dissolved by acid hydrolysis at a temperature in the range of 0–200° C.

9. The method as claimed in claim 1, characterized in that the content of phosphorus and said metal, which originates from the precipitation chemicals and which is present in the sludge is dissolved by acid hydrolysis at a temperature in the range of 100–140° C.

10. The method as claimed in claim 1, characterized in that the content of phosphorus and said metal, which originates from the precipitation chemicals and which is present in the sludge is dissolved by acid hydrolysis at a pressure ranging from about atmospheric pressure to about 1 MPa.

11. The method as claimed in claim 6, wherein the sulphide ion source is sodium sulphide.

12. The method as claimed in claim 1, wherein the amount of $Fe^{3+}$ equivalent to the content of phosphorus is supplied by adding ferric chloride, ferric sulphate or ferric chloride sulphate.

13. The method as claimed in claim 1, wherein during the step of treating the solution, the precipitation is at a pH of 2–2.8, whereby $FePO_4$ is precipitated in pure form.

14. The method as claimed in claim 1, wherein after adding the $Fe^{3+}$, a sojourn time of from about 5 minutes to 6 hours elapses before the step of separating the precipitated $FePO_4$.

15. The method as claimed in claim 14, wherein the sojourn time is from about 30 minutes to about 1 hour.

16. The method as claimed in claim 1, further comprising:
   treating the precipitated $FePO_4$ with an alkali to form ferric hydroxide;
   treating with an acid to form a ferric salt.

17. The method as claimed in claim 16, wherein the alkali is sodium hydroxide.

18. The method as claimed in claim 16, wherein the acid is hydrochloric acid or sulphuric acid.

* * * * *